United States Patent
Minehara et al.

(10) Patent No.: US 6,970,483 B2
(45) Date of Patent: Nov. 29, 2005

(54) METHOD AND A DEVICE FOR REALIZING BOTH HIGH EXTRACTION EFFICIENCY OF LASER LIGHT FROM ELECTRON BEAMS AND FEMTO-SECOND ULTRA-SHORT IN FREE-ELECTRON LASERS PULSES

(75) Inventors: Eisuke Minehara, Ibaraki (JP); Ryoichi Hajima, Ibaraki (JP); Nobuyuki Nishimori, Ibaraki (JP); Ryoji Nagai, Ibaraki (JP)

(73) Assignee: Japan Atomic Energy Research, Tokyo (JP)

( * ) Notice: Subject to any disclaimer, the term of this patent is extended or adjusted under 35 U.S.C. 154(b) by 292 days.

(21) Appl. No.: 10/104,068

(22) Filed: Mar. 25, 2002

(65) Prior Publication Data

US 2003/0179784 A1 Sep. 25, 2003

(51) Int. Cl.⁷ .............................................. H01S 3/00
(52) U.S. Cl. ........................................................ 372/2
(58) Field of Search ................................ 372/2, 73, 69

(56) References Cited

U.S. PATENT DOCUMENTS

| | | | | |
|---|---|---|---|---|
| 4,523,168 A | * | 6/1985 | Emanuelson et al. | 335/296 |
| 4,599,724 A | * | 7/1986 | McMullin | 372/2 |
| 5,197,071 A | * | 3/1993 | Yamada | 372/2 |
| 5,235,606 A | * | 8/1993 | Mourou et al. | 372/25 |
| 5,268,693 A | * | 12/1993 | Walsh | 372/74 |
| 5,353,291 A | * | 10/1994 | Sprangle et al. | 372/5 |
| 6,345,058 B1 | * | 2/2002 | Hartemann et al. | 372/2 |
| 6,433,494 B1 | * | 8/2002 | Kulish et al. | 315/500 |
| 6,636,534 B2 | * | 10/2003 | Madey et al. | 372/2 |
| 2003/0026300 A1 | * | 2/2003 | Biedron et al. | 372/2 |

FOREIGN PATENT DOCUMENTS

| | | | | |
|---|---|---|---|---|
| JP | 05145199 A | * | 6/1993 | H01S/3/30 |
| JP | 09232693 A | * | 9/1997 | H01S/3/30 |

OTHER PUBLICATIONS

N. Nishimori, et. al., "Sustained Saturation in a Free–Electron Laser Oscillator at Perfect Synchronism of an Optical Cavity", Physical Review Letters, vol. 86, No. 25, pp. 5707–5710 (2001).

* cited by examiner

Primary Examiner—Minsun Oh Harvey
Assistant Examiner—Phillip Nguyen
(74) Attorney, Agent, or Firm—Banner & Witcoff, Ltd.

(57) ABSTRACT

A method for realizing both high extraction efficiency of laser light from electron beams and femto-second ultra-short pulses in a free-electron laser, wherein the peak current of electron pulses from a superconducting or normal conducting linear accelerator serving as a driver for the free-electron laser is adjusted to be greater than a certain lower limit and electron beams are brought into perfect synchronism with light or the time of duration for which the electron pulses are repeated is made longer than the time to saturation of light oscillation (the time during which light is emitted due to the increase of optical output by an amount corresponding to the gain up to the point where the optical output does not increase any more), whereby the oscillation of light is facilitated, wherein the extraction efficiency of laser light from electron beams is increased to exceed the theoretical limit which is expressed by $1/(2 N_w)\sim 1/(4 N_w)$ ($N_w$=the number of undulator periods) of electron beam power or rendered proportional to the square of N, or the number of electrons in a micropulse, and wherein ultra-short pulses of the femto-second range are generated.

22 Claims, 1 Drawing Sheet

МЕТHOD AND A DEVICE FOR REALIZING BOTH HIGH EXTRACTION EFFICIENCY OF LASER LIGHT FROM ELECTRON BEAMS AND FEMTO-SECOND ULTRA-SHORT IN FREE-ELECTRON LASERS PULSES

BACKGROUND OF THE INVENTION

This invention relates to the technology of free-electron lasers featuring wavelength tunability, high output power, high efficiency, ultra-short pulses and high quality. These features of free-electron lasers can be effectively used in various industrial fields including medical diagnosis (of cancer, specific metabolites, erythrocyte sedimentation rate, optical CT imaging), therapeutic means (spalling of gallstone, dental caries, laser knife, laser drill, disinfection), cutting/fusing/welding (of ceramics, metal working, ship building, construction, chemical plants), modifications (of polymers, fibers, dyeing), ultra-high sensitive detection (of environmentally-harmful materials, global warming substances), decomposition (of toxic gases, environmentally-harmful materials, global warming substances), separation (elements, isotopes, refining of pharmaceuticals, removal of harmful substances), synthesis (of pharmaceuticals and thin films), energy beaming (unmanned high-altitude meteorological observers platform, communication satellites, interplanet space vehicles and probes, laser thrusting for rockets, space debris, satellites, comets, airplanes, ships and other vehicles), energy production (laser nuclear fusion, muon-catalyzed nuclear fusion), lighting sources (for detection and large-scale illumination) and heating sources (for disinfection, sterilization, decommissioning or nuclear reactors, decontamination of nuclear reactors, heat treatment, annealing, precipitation, large-scale heating). The invention relates particularly to a method and an apparatus for realizing high-extraction efficiency of laser light from electron beams in free-electron lasers with a view to achieving significant improvements in such factors as laser construction and operating costs, specific capacity per output and overall efficiency.

In free-electron lasers, the extraction efficiency of laser light from electron beams is expressed by $1/(2 \text{ Nw})\sim1/(4 \text{ Nw})$ (Nw=the number of undulator periods). In order to increase this extraction efficiency, conventional free-electron lasers have used very short undulators (with a smaller number of periods) at the sacrifice of the laser gain.

Similarly, tapered undulators have been used at the sacrifice of laser gain, with the magnetic field or the length of undulator periods being varied either through a plurality of stages or in a continuous manner. As the electron energy decreases due to the transfer of energy from electron beams to laser light, the free-electron laser is decoupled from the conditions for resonance and electron beam energy are no longer transformed to laser light energy. In order to avoid this problem, many attempts have been made to increase the limit of the extraction efficiency of the laser light from the electron beams by changing the magnetic field on undulators or the length of undulator period.

In these methods, the inherently small gain of the free-electron laser is significantly decreased, the required experimental conditions cannot be stably realized in a consistent manner and the energy tunability is sacrificed. Because of these practical disadvantages and difficulties, the methods have not been applicable except for special and impractical experiments. In fact, oscillation of high-intensity laser light producing high average power using these methods has heretofore been limited to the conceptual and no practical equipment has been realized. Therefore, in the prior technologies, in order to facilitate reliably and easily the oscillation of laser light in the free-electron laser, its gain has been increased at the sacrifice of the extraction efficiency of laser light from electron beams. In other words, there had been no specific method by which the extraction efficiency can be increased beyond its limit while maintaining high laser gain.

Another problem with the conventional free-electron laser is that it emits optical pulses slightly longer or shorter than electron pulses with width of a few to several hundred picoseconds. Hence, there has been no specific way to fabricate a high-power, high-efficiency laser capable of generating ultra-short pulses in the femto-second range including the free-electron laser.

Speaking of solid lasers, they produce low average power with low efficiency at fixed wavelength and the only practical proposal that has been made so far is for Ti:sapphire lasers to produce a large peak power of the tera-watt class in single shots of pulse shorter than 100 femto-seconds and a continuous wave of extremely low peak power.

SUMMARY OF THE INVENTION

The present invention has been accomplished under these circumstances and has as an object providing a method for realizing a free-electron laser that uses an ordinary undulator (to confine optical pulses between mirrors in a resonator such that they interact with electron beams to achieve repeated amplification) and which still produces a continuous wave of high average power while assuring both wavelength tunability and high laser gain, which increases the extraction efficiency of laser light from electron beams beyond its limit, and which can produce femto-second ultra-short pulses and, hence, high peak output power.

Another object of the invention is to provide an apparatus for implementing the method.

DETAILED DESCRIPTION OF THE INVENTION

Figure 1:
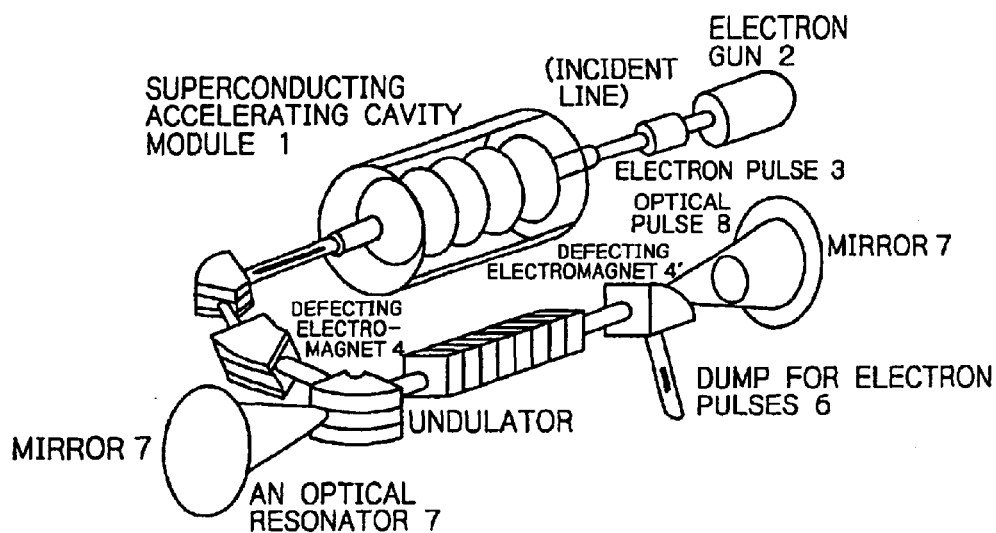
FIG. 1 is a schematic diagram of the free-electron laser of the invention.

The present inventors performed extensive studies in order to attain the stated object and eventually invented a method for realizing high extraction efficiency of laser light from electron beams in a free-electron laser, as well as an apparatus for implementing the method.

According to the invention, ultra-short pulses of the femto-second range, high efficiency, wavelength tunability, high average power and high peak power are simultaneously accomplished although these features have been absent from or impossible in the existing lasers.

The invention permits use of the free-electron laser in unparalleled applications, heretofore impossible industrial applications and in the creation of new industries by replacing the conventional lasers including those which yield high efficiency but which have fixed wavelength, wavelength tunable lasers that use inefficient dye solutions to realize practically infeasible wavelength tunability and Ti:Sapphire lasers which yield femto-second ultra-short pulses and terawatt peak power but which are inefficient and low in repetition rate.

If continuous or quasi-continuous electron beams are used with adequately high peak current (for electron pulses) having a specified dimensionless current $j_0$ of at least 20 (the gain of a free-electron laser is proportional to current, which is rendered dimensionless to provide ease in comparison with other parameters; the effect of high peak current appears at the lower limit of $j_0=10$ and becomes pronounced at 20 and above) as pulses are repeated by a sufficient number of times for the oscillation of light to be saturated, the conventional free-electron laser system usually requires that the distance between mirrors in the optical resonator must be shortened by a certain amount as compared to the value for the velocity of light in vacuum which corresponds to the time interval for the repetition of electron beams.

In the invention, the time interval for the repetition of electron beams is brought into perfect or nearly perfect agreement with the corresponding distance between mirrors in the optical resonator for the velocity of light in vacuum, thereby achieving perfect synchronization between light and electron beams; as a result, optical waveforms consisting of sharp spike pulses are generated and there also occurs superradiation which is characterized by extremely strong radiation of light. This contributes to providing a method and an apparatus for realizing both high extraction efficiency of laser light from electron beams and femto-second ultra-short pulses in free-electron lasers.

The present inventors obtained the following findings:
(1) the extraction efficiency of laser light from electron beams can be adjusted to exceed the current theoretical limit which is expressed by 1/(2 Nw)~1/(4 Nw) (Nw=the number of undulator periods) of electron beam power and rendered more or less or closely proportional to the square of N, or the number of electrons in a micropulse;
(2) from a superconducting or normal conducting linear accelerator which generates electron pulses to serve as a driver for free-electron lasers, continuous or quasi-continuous electron beams are output which have a peak current larger than a certain specified dimensionless current and adequately higher than the ordinary value, with pulses being repeated by a sufficient number of times for the oscillation of light to be saturated and said pulses being sustained for a sufficient period of time;
(3) relativistic electron beams from a free-electron laser travel at a speed which is sufficiently near but nevertheless a bit slower than the velocity of light in vacuum; to compensate for this difference in speed, the distance between mirrors in the resonator for the velocity of light in vacuum which corresponds to one half the time interval for the repetition of electron beams in the free-electron laser need be shortened by about a tenth of the wavelength of oscillating light and, hence, the distance between mirrors in the resonator need normally be a little shorter than the value for the velocity of light in vacuum which corresponds to the time interval for the repetition of electron beams; in contrast, one half the time interval for the repetition of electron beams is brought into perfect or nearly perfect agreement with the distance between mirrors in the resonator for the velocity of light in vacuum and the absolute difference is made sufficiently shorter than a tenth, even to less than about a hundredth, of the wavelength of oscillating light, so that light and electron beams are in perfect synchronism (with a permissible mismatch not greater than about a hundredth of the wavelength of oscillating light); as a result, optical waveforms are generated that consist of sharp spike pulses which are ultra-short pulses no wider than about 2–3 cycles of the oscillation wavelength, namely, femto-second pulses in the middle- to far-infrared region, causing sustained high-intensity superradiation which is characterized by extremely strong radiation of light (highly degenerate superradiation); this contributes to realizing high extraction efficiency of laser light from electron beams; and/or
(4) the electron bunches in an undulator (which are generated when the electron pulses in the superconducting accelerator are accelerated and decelerated in the undulator) cause quantum fluctuation(shot noise) in the optical pulses stored in the resonator and this quantum fluctuation is indispensable to ensuring that oscillation of laser light is sustained from the initial state of lasing to the saturated state where the generation of high power is sustained.

The method and apparatus of the invention for realizing both high extraction efficiency of laser light from electron beams and femto-second ultra-short pulses in free-electron lasers have been accomplished on the basis of these findings.

Figure 2:
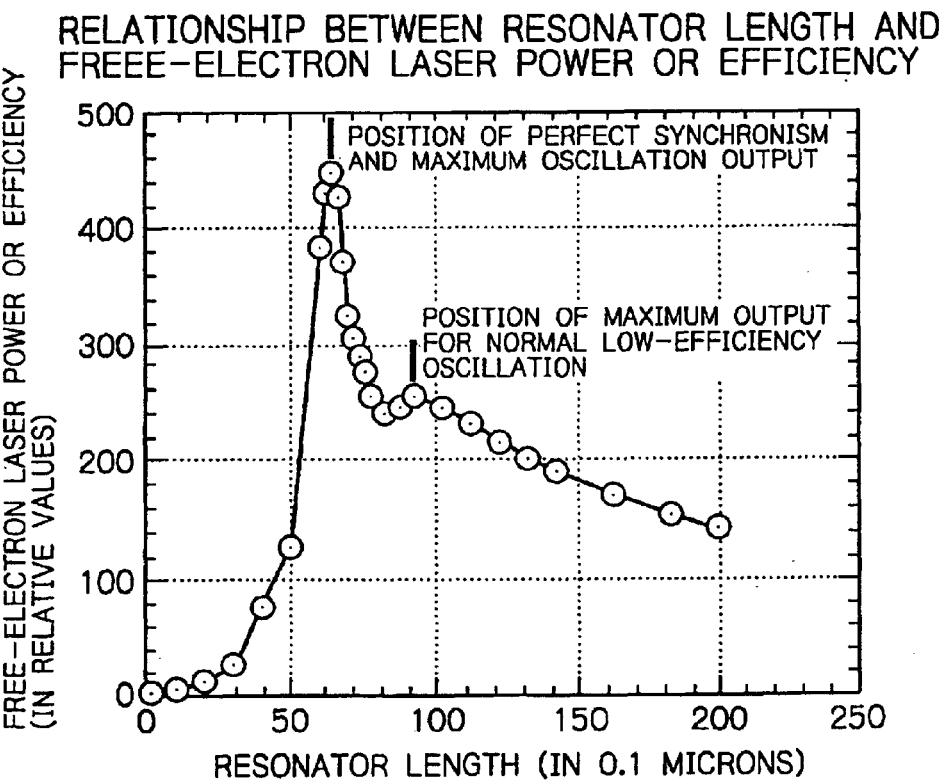
FIG. 2 is a graph showing the relationship between resonator length and free-electron laser power or efficiency, with the resonator length decreasing to the right on the horizontal axis.

The constitution of the invention is described below specifically with reference to the accompanying drawings. FIG. 1 is an overall view of a free-electron laser including an electron linear accelerator; FIG. 2 shows how the free-electron laser attains the object of the invention by realizing high extraction efficiency of laser light from electron beams and femto-second ultra-short pulses.

In FIG. 1, numeral 1 refers to a superconducting accelerating cavity module (superconducting electron linear accelerator), 2 is an electron gun, 3 is a train of electron beam pulses, 4 and 4' are deflecting electromagnets, 5 is an undulator, 6 is a dump of electron beam pulses, 7 is an optical resonator at perfect synchronism and the associated mirrors, and 8 is a train of optical pulses having a time duration of the femto-second range.

A train of electron beam pulses 3 generated from the electron gun 1 in the free-electron laser are injected into the superconducting electron linear accelerator 1 and accelerated to generate optical pulses. The accelerated electron beam pulses deflected by the deflecting electromagnet 4 and the reflected and generated optical pulses in the undulator have the direction of their travel and are then introduced into the undulator 5. The electron beam pulses are separated from the optical pulses by the deflecting electromagnet 4' and discarded in the beam dump 6. The optical pulses separated from the electron pulses are reflected repeatedly between the two mirrors 7 in the optical resonator so that they undergo a successive chain of interactions with the electron beams and are amplified to produce high-intensity optical pulses.

In this case, the distance between mirrors in the resonator for the velocity of light in vacuum which corresponds to one half the time interval for the repetition of electron beams in the free-electron laser is brought into perfect or nearly perfect agreement with the perfect synchronous length permitting a mismatch smaller than about a hundredth of the wavelength of electron beams, thereby achieving perfect synchronism between light and electron beams; as a result, optical waveforms are generated that consist of sharp spike pulses which are ultra-short pulses being shorter than about 2–3 cycles of the oscillation wavelength, namely, femto-second pulses in the middle- to far-infrared region and there also occurs sustained oscillation in high-intensity superradiation which is characterized by extremely strong radiation of light (oscillation in highly degenerate superradiation); this contributes to realizing high extraction efficiency of laser light from electron beams.

Referring to FIG. 2, the second peak indicates a position of maximum output for normal low-efficiency oscillation after speed difference compensation; the first maximum peak indicates a position of perfect synchronism and maximum oscillation output, corresponding to a maximum output peak for the case of oscillation in highly degenerate and efficient superradiation. The horizontal axis of FIG. 2 plots the resonator length (in steps of 0.1 microns) which decreases toward the right, and the vertical axis plots relative output or efficiency.

The superconducting linear accelerator 1 as the driver (starting with the electron gun 2 and ending with the exit of the accelerator 1) is designed to operate on continuous waves having an adequately high peak current and an adequately long pulse duration. If the length of the resonator is increased from the position where it is well shorter than the length associated with the repetition of electron pulses toward the point of agreement, two peaks appear and then laser oscillation stops abruptly if the resonator becomes slightly longer than the position of perfect agreement. The second and smaller peak or the second maximum point providing a shoulder represents the state of pulses having long time duration that are produced by normal, low-efficiency and low-output oscillation. This peak is found at the position where the resonator length is shortened by about 10% of the wavelength of the free-electron laser oscillation in order to compensate for the difference in velocity between light and electron beam pulses. The first peak is a very sharp maximum point. If the peak current is low and the number of repetitions is small, the first peak does not appear and only the second and smaller peak appears.

The dimensionless current $j_0$ used in the invention is Colson's dimensionless current and defined by the following equation:

$$j_0 = 8\pi^2 (a_\omega \lambda_\omega [JJ])^2 (N_w/\gamma_0)^3 (I/I_A \Sigma) f$$

where $a_\omega$ is the undulator parameter; $\lambda_\omega$ is the undulator period; $[JJ]$ is the Bessel function for an undulator; $N_w$ is the number of undulator periods; $\gamma_0$ is the energy of electron beams expressed by using $mc^2=0.511$ MeV as the unit; I is the peak current; $I_A \sim 17,000$ A is the Alfven limit current; $\Sigma = \lambda Z_R/2$ is the optical mode volume; $\lambda$ is the wavelength of oscillating laser; $Z_R$ is the Rayleigh range; and f is the filling factor.

EXAMPLE 1

The normal conducting or superconducting linear accelerator as the driver is designed to operate in continuous wave having an adequately high peak current and an adequately long duration of electron pulse. As shown in FIG. 2, if the length of the resonator is increased from the position where it is well shorter than the length associated with the repetition of electron pulses toward the point of agreement, two peaks appear and laser oscillation of maximum intensity stops abruptly if the resonator becomes slightly longer than when it is at the position of perfect agreement.

The second and smaller peak or the second maximum point providing a shoulder represents the state of pulses having the longer time duration that are produced by normal oscillation of low-efficiency and low-output. This peak is found at the position where the resonator length is shortened by about 10% of the wavelength of laser in order to compensate for the difference in velocity between light and electron pulses. The second and smaller peak is not found with low current and short pulse duration and it is found with adequately high current and adequately long pulse duration.

The first peak is a very sharp maximum point where the state of oscillation is sustained in a stable manner. The resonator length is adjusted to coincide with this point representing perfect synchronism, whereupon sustained or intermittent laser light is generated that comprises femto-second ultra-short pulses, which has high efficiency, high average and high peak power and which is wavelength tunable. Because of high efficiency, high average power and ultra-short pulses of the femto-second range, the laser light has high peak power. Using the multi-photon photochemical reactions that can be produced by such a high peak power, commercially-profitable operations can be performed as exemplified by large-scale separation, decomposition, modification and production.

EXAMPLE 2

The normal conducting or superconducting linear accelerator as the driver is designed to operate on continuous waves having an adequately high peak current and an adequately long pulse duration. Referring again to FIG. 2 which shows a curve representing the correlation between resonator length and power (detuning curve), the laser wavelength resolution width, efficiency and output power vary with respective parts of the curve. Using this feature, diagnosis and measurements of various factors such as the wavelength dependency of the rate of reaction and so on are performed by operating the free-electron laser at low power, low efficiency and higher-resolution. Other operations such as treatment and decomposition are performed by operating the free-electron laser in the state of perfect synchronism characterized by high power, high efficiency and lower-resolution.

EXAMPLE 3

If the superconducting linear accelerator as the driver is used to lase at low efficiency (<1%), energy recovery geometry and operation can be accomplished. Irrespective of whether the linear accelerator is normal conducting or superconducting, only low percentage of energy recovery becomes possible if the efficiency is approximately from several to ten percent; however, laser light of high power can be obtained, and the generation of radiation can be produced, particularly the production of radioactivity inducing neutrons down to several orders of magnitude.

ADVANTAGES OF THE INVENTION

As described above, the present invention provides a method for realizing high extraction efficiency of laser light from electron beams in free-electron lasers. Conventional approaches have been by using an undulator having a small number of periods, or changing the length of the undulator period or using a tapered undulator capable of changing the magnetic field. The present invention uses an ordinary undulator and an optical resonator and yet the heretofore unavoidable drawbacks such as unstable operation, lack of wavelength tunability, low gain and low power, being happened in the conventional approaches, can be eliminated whereas the heretofore unattainable goal can be attained, i.e. to realize ultra-short pulse, high efficiency, operational stability, tunability, high average power, high peak power in free-electron lasers.

Conventional free-electron lasers have used an undulator having a small number of periods, or changed the length of the undulator period or used a tapered undulator capable of changing the intensity of magnetic field. These approaches have unavoidable drawbacks such as unstable operation, lack of wavelength tunability, low gain and low power but these can be eliminated from the free-electron laser of the present invention; this laser is easy to automate and the heretofore difficult-to-realize goal can be attained, i.e. to provide ultra-short pulse, high efficiency, operational stability, tunability, high average power, high peak power in free-electron lasers.

What is claimed is:

1. A free-electron laser for realizing high extraction efficiency of laser light from electron beams, which comprises a series connection of an electron gun, a superconducting or normal conducting electron linear accelerator and deflecting electromagnets, one of said deflecting electromagnets having an outlet for discarding electron beams and an optical resonator being coupled externally such that a mirror is positioned at each end of an undulator, wherein electron pulses are generated from said electron gun, accelerated with said accelerator and introduced into the optical resonator to generate laser light, which is reflected back and forth between the mirrors, whereupon the quantum fluctuation in the electron bunches in said undulator caused in the optical pulses stored in the resonator sustains oscillation of laser light from the initial state of lasing to the saturated state where the generation of high power is sustained.

2. A method for obtaining high extraction efficiency of laser light from electron beams in excess of the theoretical limit, expressed by 1/2 Nw) to 1/(4 Nw), wherein Nw means the number of undulator periods, and rendering the extraction efficiency closely proportional to the square of the number of electrons in a micropulse and for generating femto-second ultra-short pulses in a free-electron laser having a resonator with mirrors and a superconducting or normal conducting linear accelerator serving as a driver, said method comprising adjusting the peak current of electron micropulses from the driver to be greater than a certain lower limit and adjusting the time interval for repetition of the micropulses to the time required for the micropulse to traverse the distance between the mirrors in the resonator to synchronize the electron beams with the laser light.

3. The method according to claim 2, said beams having a speed slightly below the velocity of light in a vacuum, said method further comprising adjusting the distance between the mirrors to within 1 tenth of the wavelength of the oscillating light less than the distance corresponding to one-half of the time interval for repetition of the micropulses to synchronize the electron beams and the laser light.

4. The method according to claim 3, wherein the distance between the mirrors is adjusted to less than about 1 one-hundredth of the wavelength of the oscillating light less than the distance corresponding to one-half of the time interval for repetition of the micropulses.

5. The method according to claim 2, wherein the laser further comprises an undulator, and electron bunches in the undulator caused by acceleration and deceleration of electron pulses in the superconducting accelerator cause quantum fluctuation in optical pulses stored in the resonator, said method further comprising using the quantum fluctuation to sustain the laser light at a saturated state at which generation of high power is sustained.

6. The method according to claim 3, wherein the laser further comprises an undulator, and electron bunches in the undulator caused by acceleration and deceleration of electron pulses in the superconducting accelerator cause quantum fluctuation in optical pulses stored in the resonator, said method further comprising using the quantum fluctuation to sustain the laser light at a saturated state at which generation of high power is sustained.

7. The method according to claim 4, wherein the laser further comprises an undulator, and electron bunches in the undulator caused by acceleration and deceleration of electron pulses in the superconducting accelerator cause quantum fluctuation in optical pulses stored in the resonator, said method further comprising using the quantum fluctuation to sustain the laser light at a saturated state at which generation of high power is sustained.

8. A method for obtaining high extraction efficiency of laser light from electron beams in excess of the theoretical limit, expressed by 1/42 Nw) to 1/(4 Nw), wherein Nw means the number of undulator periods, or rendered proportional to the square of N which is the number of electrons in a micropulse, and rendering the extraction efficiency closely proportional to the square of the number of electrons in a micropulse and for generating femto-second ultra-short pulses in a free-electron laser having a resonator with mirrors and a superconducting or normal conducting linear accelerator serving as a driver, said method comprising adjusting the peak current of electron micropulses from the driver to be greater than a certain lower limit and adjusting the duration of the micropulses to be greater than the time to saturate the oscillation of the laser light.

9. The method of claim 8, wherein the peak current has a dimensionless current $j_0$ of at least about 10 and the electron beam micropulses are repeated for a number of times and for a period sufficient saturate the oscillation of the laser light.

10. The method according to claim 8, said beams having a speed slightly below the velocity of light in a vacuum, said method further comprising adjusting the distance between the mirrors to within 1 tenth of the wavelength of the oscillating light less than the distance corresponding to one-half of the time interval for repetition of the micropulses to synchronize the electron beams and the laser light.

11. The method according to claim 9, said beams having a speed slightly below the velocity of light in a vacuum, said method further comprising adjusting the distance between the mirrors to within 1 tenth of the wavelength of the oscillating light less than the distance corresponding to one-half of the time interval for repetition of the micropulses to synchronize the electron beams and the laser light.

12. The method according to claim 10, wherein the distance between the mirrors is adjusted to less than about 1 one-hundredth of the wavelength of the oscillating light less than the distance corresponding to one-half of the time interval for repetition of the micropulses.

13. The method according to claim 11, wherein the distance between the mirrors is adjusted to less than about 1 one-hundredth of the wavelength of the oscillating light less than the distance corresponding to one-half of the time interval for repetition of the micropulses.

14. The method according to claim 8, wherein the laser further comprises an undulator, and electron bunches in the undulator caused by acceleration and deceleration of electron pulses in the superconducting accelerator cause quantum fluctuation in optical pulses stored in the resonator, said method further comprising using the quantum fluctuation to sustain the laser light at a saturated state at which generation of high power is sustained.

15. The method according to claim 9, wherein the laser further comprises an undulator, and electron bunches in the undulator caused by acceleration and deceleration of electron pulses in the superconducting accelerator cause quantum fluctuation in optical pulses stored in the resonator, said method further comprising using the quantum fluctuation to sustain the laser light at a saturated state at which generation of high power is sustained.

16. The method according to claim 10, wherein the laser further comprises an undulator, and electron bunches in the undulator caused by acceleration and deceleration of electron pulses in the superconducting accelerator cause quantum fluctuation in optical pulses stored in the resonator, said method further comprising using the quantum fluctuation to sustain the laser light at the saturated state at which generation of high power is sustained.

17. The method according to claim 11, wherein the laser further comprises an undulator, and electron bunches in the undulator caused by acceleration and deceleration of electron pulses in the superconducting accelerator cause quantum fluctuation in optical pulses stored in the resonator, said method further comprising using the quantum fluctuation to sustain the laser light at a saturated state at which generation of high power is sustained.

18. The method according to claim 12, wherein the laser further comprises an undulator, and electron bunches in the undulator caused by acceleration and deceleration of electron pulses in the superconducting accelerator cause quantum fluctuation in optical pulses stored in the resonator, said method further comprising using the quantum fluctuation to sustain the laser light at a saturated state at which generation of high power is sustained.

19. The method according to claim 13, wherein the laser further comprises an undulator, and electron bunches in the undulator caused by acceleration and deceleration of electron pulses in the superconducting accelerator cause quantum fluctuation in optical pulses stored in the resonator, said method further comprising using the quantum fluctuation to sustain the laser light at a saturated state at which generation of high power is sustained.

20. A method for generating both higher extraction efficiency of laser light from electron beams and a few cycle-long FIR (far-infra-red) and MIR (middle infra-red) wavelength radiation of femto-second ultra-short pulse in a free-electron pulse arrival and stored FEL (free-electron laser) light pulse arrival inside the FEL optical laser,
    wherein the extraction efficiency of laser light from electron beams is increased to exceed the theoretical limit which is expressed by $1/(2 Nw)$ to $1/(4 Nw)$,
    wherein Nw means the number of undulator periods, and the perfect synchronization means that the distance difference between the electron beam and FEL light is around or less than 0.2% of the FEL oscillation wavelength.

21. The method according to claim 20, which simultaneously realizes highly degenerate, and high-intensity super-radiance radiation which is characterized by extremely strong radiation of light proportional to the square of the number of electrons N in an electron pulse.

22. A method for realizing both high extraction efficiency of laser light from electron beams and laser light of femto-second ultra-short pulses in a free-electron laser apparatus which comprises a series connection of an electron gun, a super-conducting or normal conducting electron linear accelerator and deflecting electromagnetics, one of said deflecting electromagnets having an outlet for discarding electron beams and an optical resonator being coupled externally such that a mirror is positioned at each end of an undulator,
    characterized in adjusting the peak current of electron beam pulses from the accelerator to be greater than a certain lower limit to bring electron beams into perfect synchronism with light, or making the time duration for which the electron beam pulses are repeated longer than the time to saturation of light oscillation to facilitate the oscillation of light,
    wherein the extraction efficiency of laser light from electron is increased to exceed the theoretical limit which is expressed by $1/(2 Nw)$ to $1/(4 Nw)$, wherein Nw means the number of undulator periods, or rendered proportional to the square of N which is the number of electrons in a micropulse.

* * * * *

UNITED STATES PATENT AND TRADEMARK OFFICE
CERTIFICATE OF CORRECTION

PATENT NO. : 6,970,483 B2
DATED : November 29, 2005
INVENTOR(S) : Eisuke Minehara et al.

It is certified that error appears in the above-identified patent and that said Letters Patent is hereby corrected as shown below:

<u>Title page,</u>
Item [73], Assignee, should read -- Japan Atomic Energy Research Institute --.

<u>Column 7,</u>
Line 25, replace "1/2 Nw)" with -- 1/(2 Nw) --.

<u>Column 8,</u>
Line 9, replace "1/42 Nw)" with -- 1/(2 Nw) --.
Lines 10-11, replace "or rendered proportional" with -- and rendering the extraction efficiency closely proportional --.
Line 11, replace "square of N which is the number" with -- square of the number --.
Lines 12-14, replace "micropulse, and rendering the extraction efficiency closely proportional to the square number of electrons in a micropulse and" with -- micropulse and --.

Signed and Sealed this

Eleventh Day of April, 2006

JON W. DUDAS
*Director of the United States Patent and Trademark Office*